Patented Mar. 23, 1954

2,673,144

UNITED STATES PATENT OFFICE 2,673,144

AUXILIARY ALCOHOL-WATER FUEL

Niles A. Huggler, Cleveland, Ohio, assignor to The Standard Oil Company, Cleveland, Ohio, a corporation of Ohio No Drawing. Application June 10, 1950,
Serial No. 167,483

10 Claims. (Cl. 44—53)

The present invention relates to supplementary automotive fuels. More particularly the invention embodies an improved alcohol type fuel to supplement the ordinary gasoline fuel during the period of high octane demand of an internal combustion engine.

Automotive research has shown the advantages of a high compression engine. For its most efficient operation, such an engine requires a gasoline having a relatively high octane rating during certain periods in order to prevent knocking of the engine.

These high compression engines, however, actually demand a high octane fuel only for short periods when subjected to great loads, e. g., when climbing hills or accelerating. A regular grade gasoline is quite satisfactory in a high compression engine under normal cruising conditions. In order to take advantage of the lower price of regular gasoline, a number of proposals have been made which enable its use in a high compression engine.

One such proposal is to employ an auxiliary fuel system which automatically supplies a supplementary fuel or anti-detonant to the engine during periods of open throttle operation. One such system known generally as the "Vitameter," injects an auxiliary fuel or anti-detonant into the engine intake manifold. This auxiliary fuel generally comprises a mixture of an alcohol and water. Its injection has the effect of raising appreciably the octane rating of the regular gasoline entering the engine at the time by some 10 to 20 units. The alcohol may be an aliphatic water-soluble alcohol. Methyl, ethyl and isopropyl alcohol can be used. Methyl alcohol is cheaper and for that reason is often employed. The alcohol and water are usually in the proportions of 25% to 90% alcohol and the balance water. The auxiliary fuel may also contain small amounts of other anti-detonants such as tetra-ethyl lead, amines, iron carbonyl, etc. When tetra-ethyl lead is included the proportion of the alcohol must be sufficiently high to maintain the tetra-ethyl lead in solution.

Such an alcohol-water type mixture, while having suitable anti-detonant properties, does not serve as a complete answer to the problem of auxiliary fuels, because experience has shown that they are corrosive to the metal parts of the system and deposit hard white flocculent precipitates. These deposits, along with the corrosion products, clog the screens, filters, jets and other parts of the auxiliary fuel system and thereby decrease the working efficiency of the system. These deposits are usually water insoluble salts of metals, such as calcium and heavy metals. The formation of this troublesome material is not due solely to the hardness of the water or impurities in the alcohol, because it takes place when distilled water and a highly refined alcohol are used.

It is an object of this invention to provide an improved auxiliary fuel which will not form a precipitate in use and will not clog the operating parts of the auxiliary fuel system.

In accordance with the invention, a three-component additive is incorporated in the mixture of alcohol and water auxiliary fuel. The additive comprises (1) a water-soluble chelating agent capable of forming soluble complex nonionic compounds with alkaline earth and heavier metals; (2) a buffering agent to maintain the pH of the auxiliary fuel at 7 or higher; and (3) a polar type surface reactive material to form a protecting film on the metal parts of the system, or prevent oxidation of the metal surface.

An advantage of the invention is that it avoids the necessity of cleaning the auxiliary fuel system.

A further advantage resides in the fact that the invention allows a freer flow of auxiliary fuel to the combustion chamber, thereby enabling the chamber to be supplied with a larger amount of auxiliary fuel when extra power is needed.

Further objects and advantages of the invention will appear as they are described in detail below.

As the chelating agent, I may use a water-soluble salt or ester of an organic amino-carboxylic acid containing in relation to one basic nitrogen atom more than one carboxylic acid group standing in alpha-position thereto. Typical of such compounds and preferred for the purposes of this invention are the sodium and potassium salts or esters of ethylenediaminetetracetic acid. The disodium salt has the formula:

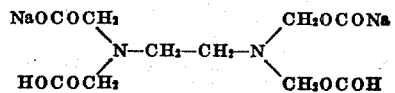

It combines with metals, for example, calcium, as follows:

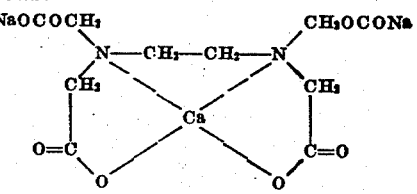

The disturbing hard white deposits of calcium compounds and other metals go into solution in this manner and do not settle out onto any of the vital parts of the auxiliary fuel system and are rendered harmless.

The chelating effect is not limited to the metal ions found in water or alcohol, but includes any corrosion products that might be present.

Other typical chelating agents of the above type are trimethylamine tricarboxylic acid, iminodiacetic acid, and aryl and alkyl iminodiacetic acids.

Any water-soluble alkaline buffering agent may be added. In general these are salts formed by the combination of a strong base and a weak acid. Triethanolamine and other strong amine and alkali metal phosphates and borates, and citrates are typical of those suitable for the purposes of this invention. Sodium salts, such as sodium tetraborate are not subject to complete combustion in the engine but has not been observed to effect detrimentally the efficiency or working of the engine. I prefer triethanolamine phosphate, or ethylenediamine citrate or acetate as a buffering material because of its more combustible character.

Any water soluble polar type surface reactive material is included which will prevent corrosive attack on the metal parts. This inhibits corrosion or rust (see Id. Eng. Chem. 41, 137–144 (1949)) and may have some antioxidant action. For optimum results such a polar type surface reactive material should, like the buffer, be capable of complete burning in the combustion chamber. As such a material, I have chosen mercaptobenzothiazole and its alkali metal or amine or ammonium salts as being the most preferable. This compound exhibits the desired qualities and forms a protective film on the metal parts of the auxiliary fuel system so that no corrosion may take place.

Notwithstanding what may appear to be the separate action of each component of the additive, it has been found that all three components are essential and coact as a dispersant additive, keeping any normally insoluble materials in solution or suspension and minimizing corrosion, clogging and wear of the metal parts.

As illustrative of the insufficiency of any two of the components, it was found that compositions containing only the buffer and the surface reactive material, and compositions containing only the chelating agent and the surface reactive material gave too much precipitate. Compositions which contained only the chelating agent and the buffer were too corrosive, showing the necessity for the surface reactive material.

The compositions which contained all three components, however, especially when selected within the ranges mentioned hereafter, were satisfactory in actual commercial use.

The relative proportions of chelating agent, buffering agent and polar type surface reactive material to one another and their concentration in the auxiliary fuel may vary within relatively wide limits depending somewhat upon the properties of the individual components and the requirements of the particular fuel. Excellent results have been obtained with concentrations of 750 to 7500 parts of a mixture of chelating agent, buffer and polar type surface reactive material in a million parts auxiliary fuel and ordinarily the inclusions in the fuel of such a mixture in concentration exceeding about 1% will serve no useful purpose not achieved by lesser concentrations. The amount of buffer is dependent upon the alkalinity of the buffer itself and upon the tendency of the fuel mixture to go to the acid side, but in any event it should be such amount to maintain preferably a pH of 7 to 8 (not over 9) in the auxiliary fuel mixture. The amount of surface reactive material is similarly dependent upon its surface reactive capabilities and the corrosivity of the fuel. I have found that for practical purposes the relative proportions to each other of the components in the additive for the auxiliary fuel should be within the following ranges:

| | Parts by weight |
|---|---|
| Chelating agent | 5 to 20 |
| Buffering agent | 2 to 50 |
| Polar type surface reactive material | 0.5 to 5 |

When used in these relative proportions to give a total concentration in the fuel of 750 to 7500 parts per million, the concentration of each ingredient in the fuel will be as follows:

| | Parts per million |
|---|---|
| Chelating agent | 500 to 2000 |
| Buffering agent | 200 to 5000 |
| Polar type surface reactive material | 50 to 500 |

To further illustrate the invention, the following formulae are included, it being understood, however, that my invention is not limited to the proportions and components given therein.

Example 1

Fuel:

| | Parts by weight |
|---|---|
| 50% methyl alcohol, 50% water | 99.65 |
| Additive: | |
| 35% solution of sodium salt of ethylene diamine tetra acetic acid | 0.165 |
| Borax | 0.165 |
| 50% aqueous solution of sodium mercaptobenzothiazole | 0.02 |

Example 2

Fuel:

| | Parts by weight |
|---|---|
| 85 volumes of methyl alcohol, 15 volumes of water and 0.08 volumes of commercial tetraethyl lead | 99.6 |
| Additive: | |
| 50% of a 35% solution of a sodium salt of ethylene diamine tetra acetic acid, 46% borax, 4% of a 50% aqueous solution of sodium mercaptobenzothiazole | 0.4 |

Example 3

Fuel:

| | Parts by weight |
|---|---|
| 85 volumes of methyl alcohol, 15 volumes of water and 0.08 volumes of commercial tetraethyl lead | 99.75 |
| Additive: | |
| 20% of a 35% solution of a salt of ethylene diamine tetra acetic acid, 67% of triethanolamine phosphate, 13% of a 50% aqueous solution of sodium mercaptobenzothiazole | 0.25 |

The auxiliary fuels described in the foregoing examples perform in an excellent manner and function with complete absence of clogging in and corrosion of the auxiliary fuel injection system.

The specific embodiments disclosed herein are obviously susceptible of modification within the spirit of the invention, and are not to be regarded as imposing any limitations whatsoever upon the scope of the following claims.

I claim:

1. An auxiliary fuel for use in combustion engines consisting essentially of from about 25 to 90% by weight of a lower alkanol having from 1 to 3 carbon atoms and from about 10 to 75% by weight of water, and additionally containing from 500 to 2000 parts per million of a chelating agent selected from the group consisting of the water-soluble salts and esters of an amino carboxylic acid containing in relation to one basic nitrogen atom more than one carboxylic acid group standing in alpha position thereto, to prevent the formation of precipitates; from 200 to 5000 parts per million of an alkaline buffer salt of a strong base and a weak acid to maintain a pH of at least 7; and from 50 to 500 parts per million of a water-soluble salt of mercaptobenzothiazole, said parts per million being based on the total weight of alcohol and water.

2. An auxiliary fuel in accordance with claim 1 in which the chelating agent is an alkali metal salt of ethylene diamine tetra acetic acid.

3. An auxiliary fuel in accordance with claim 1 in which the alkaline buffer is triethanolamine phosphate.

4. An auxiliary fuel in accordance with claim 1 in which the water-soluble salt of mercaptobenzothiazole is sodium mercaptobenzothiazole.

5. An auxiliary fuel in accordance with claim 1 in which the chelating agent is an alkali metal salt of ethylene diamine tetra acetic acid, the alkaline buffer is triethanolamine phosphate and the water-soluble salt of mercaptobenzothiazole is sodium mercaptobenzothiazole.

6. A mixture for addition to an alcohol-water type auxiliary fuel consisting essentially of from 5 to 20 parts by weight of a chelating agent selected from the group consisting of the water-soluble salts and esters of an amino-carboxylic acid containing in relation to one basic nitrogen atom more than one carboxylic acid group standing in alpha position thereto, to prevent the formation of precipitates; from 2 to 50 parts by weight of an alkaline buffer salt of a strong base and a weak acid to maintain a pH of at least 7; and from 0.5 to 5 parts by weight of a water-soluble salt of mercaptobenzothiazole.

7. A mixture in accordance with claim 6 in which the water-soluble salt of mercaptobenzothiazole is sodium mercaptobenzothiazole.

8. A mixture in accordance with claim 6 wherein the chelating agent is an alkali metal salt of ethylene diamine tetra acetic acid.

9. A mixture in accordance with claim 6 wherein the alkaline buffer salt is triethanolamine phosphate.

10. A mixture in accordance with claim 6 in which the chelating agent is an alkali metal salt of ethylene diamine tetra acetic acid, the alkaline buffer is triethanolamine phosphate and the alkali metal salt of mercaptobenzothiazole is sodium mercaptobenzothiazole.

NILES A. HUGGLER.

References Cited in the file of this patent

UNITED STATES PATENTS

| Number | Name | Date |
|---|---|---|
| 1,644,267 | Ostwald | Oct. 4, 1927 |
| 2,215,814 | Hall | Sept. 24, 1940 |
| 2,252,385 | Orozco | Aug. 12, 1941 |
| 2,373,570 | Keller | Apr. 10, 1945 |
| 2,412,944 | Bersworth | Dec. 24, 1946 |
| 2,462,694 | Walker | Feb. 22, 1949 |

OTHER REFERENCES

Bersworth et al., "Chelating Agents in Soap," Soap and Sanitary Chemicals, March 1950, pages 45–47 and 73.